United States Patent [19]

Kumar et al.

[11] Patent Number: 5,248,566

[45] Date of Patent: Sep. 28, 1993

[54] FUEL CELL SYSTEM FOR TRANSPORTATION APPLICATIONS

[75] Inventors: Romesh Kumar, Naperville; Shabbir Ahmed, Evanston; Michael Krumpelt, Naperville; Kevin M. Myles, Downers Grove, all of Ill.

[73] Assignee: The United States of America as represented by the United States Department of Energy, Washington, D.C.

[21] Appl. No.: 796,973

[22] Filed: Nov. 25, 1991

[51] Int. Cl.5 ............................................. H01M 8/14
[52] U.S. Cl. ....................................... 429/19; 429/17; 429/20; 180/65.3
[58] Field of Search ..................... 429/17, 19, 20; 180/65.3

[56] References Cited

U.S. PATENT DOCUMENTS

| | | |
|---|---|---|
| 4,365,006 | 12/1982 | Baker ........................ 429/17 |
| 4,716,859 | 1/1988 | Konig et al. . |
| 4,988,580 | 1/1991 | Ohsaki et al. . |
| 4,999,993 | 3/1991 | Rao . |

OTHER PUBLICATIONS

Kumar et al., "Methanol Reformers for Fuel Cell Powered Vehicles: Some Design Considerations", 1990 Fuel Cell Seminar, Nov. 25-28, 1990.
Lemons R., "Fuel Cells For Transportation", Journal of Power Sources, Jan. 1990, pp. 251-264.

Primary Examiner—Prince Willis, Jr.
Assistant Examiner—M. Nuzzolillo
Attorney, Agent, or Firm—Mark P. Dvorscak; Robert J. Fisher; William R. Moser

[57] ABSTRACT

A propulsion system for a vehicle having pairs of front and rear wheels and a fuel tank. An electrically driven motor having an output shaft operatively connected to at least one of said pair of wheels is connected to a fuel cell having a positive electrode and a negative electrode separated by an electrolyte for producing dc power to operate the motor. A partial oxidation reformer is connected both to the fuel tank and to the fuel cell receives hydrogen-containing fuel from the fuel tank and water and air and for partially oxidizing and reforming the fuel with water and air in the presence of an oxidizing catalyst and a reforming catalyst to produce a hydrogen-containing gas. The hydrogen-containing gas is sent from the partial oxidation reformer to the fuel cell negative electrode while air is transported to the fuel cell positive electrode to produce dc power for operating the electric motor.

23 Claims, 3 Drawing Sheets

FUEL CELL SYSTEM FOR TRANSPORTATION APPLICATIONS

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

BACKGROUND OF THE INVENTION

Fuel cells are being developed for use in automotive propulsion systems as alternatives for the internal combustion engine in buses, vans, and passenger cars. The major motivations for developing fuel cell powered vehicles are low emissions of pollutants, high fuel energy conversion efficiencies, superior acceleration, low noise and vibration, and the possibility of using coal or biomassderived alcohols rather than petroleum-based fuels, although petroleum-based fuels can also be used.

The two most important operational requirements for a stand-alone fuel cell power system for a vehicle are the ability to start up quickly and the ability to supply the necessary power on demand for the dynamically fluctuating load. The rapid start-up requirement is obvious. An example of the dynamic performance requirement is given in FIG. 1, which shows the simulated velocity and power profiles for a small car, the IETV-1, operated on the Simplified Federal Urban Driving Schedule (SFUDS). On this schedule the power varies 15 times over 6 min; in actual driving the power fluctuations are typically more numerous and more complex.

Alcohols such as methanol and ethanol are likely fuels for use in fuel cells for transportation applications. Methanol is a commodity chemical that is manufactured from coal, natural gas, and other feedstocks, while ethanol is often produced from grain. For use in a fuel cell, however, alcohol must first be converted (reformed) to a hydrogen-rich gas mixture. The desired features for such a fuel reformer include rapid start-up, good dynamic response, high fuel conversion, small size and weight, simple construction and operation, and low cost.

Methanol has been used in steam reforming for providing a hydrogen-rich gas stream for mobile combustion engines, see Konig et al, U.S. Pat. No. 4,716,859, and water as a reaction product from a fuel cell has been recycled for use in steam reforming of methanol, see Baker, U.S. Pat. No. 4,365,006. Steam reforming of methanol is endothermic and complicates, by its energy requirement, its use in a vehicle.

Supplying the hydrogen-rich gas on demand in an intermittent variable demand environment also is a difficult requirement to meet and has been addressed by Ohsaki, et al, U.S. Pat. No. 4,988,580, but this suggestion is not applicable to a small, mobile system. The catalytic, exothermic partial oxidation-reforming of fuels to produce hydrogen-rich gas streams is known, see Rao, U.S. Pat. No. 4,999,993, but the use of a partial oxidation-reformer has not been used in a vehicle to accomplish the purposes of this invention.

SUMMARY OF THE INVENTION

This invention relates to a partial oxidation reformer which has longitudinally spaced apart zones for holding oxidation catalysts and reforming catalysts for partially oxidizing and reforming mixtures of water, air and fuel into a hydrogen-containing gas.

The invention, in one aspect, combines a particular oxidation reformer with a fuel cell for using the hydrogen-containing gas put out by the partial oxidation reformer and air to produce dc power which operates an electric motor in a transportation vehicle.

In yet another aspect of the invention, the partial oxidation reformer is provided with a third zone holding either an oxidation catalyst or a methanation catalyst for converting any carbon monoxide present respectively into carbon dioxide or methane.

In another aspect of the invention, an afterburner unit is used in connection with the exhaust gases from the negative electrode of the fuel cell to convert remaining hydrogen to heat and water.

DESCRIPTION OF THE PREFERRED EMBODIMENTS

Figure 1A:
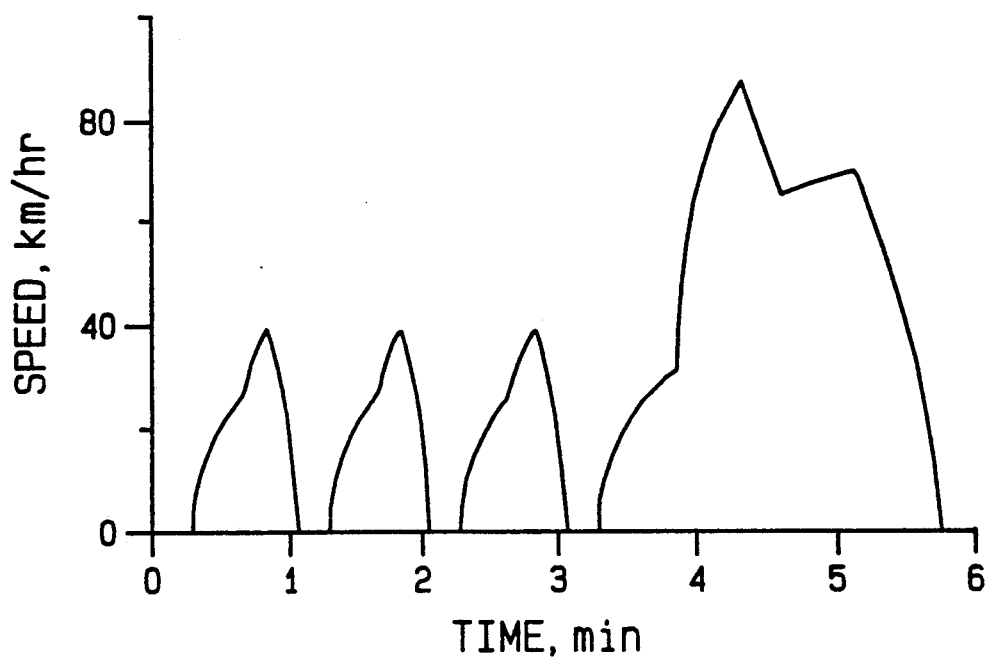
FIG. 1 is a graphical representation of the velocity and power profiles for the IETV-1 simulated on the SFUDS driving schedule: (a) velocity vs. time; (b) power vs time.
Figure 1B:
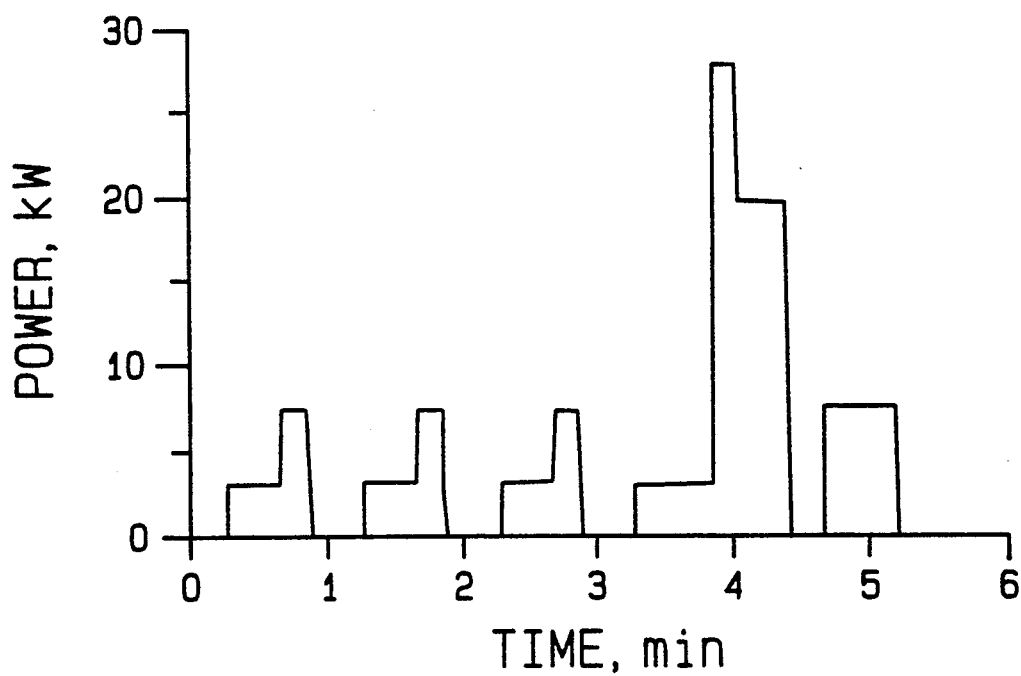

Fuels which may be used in the subject invention may be either liquid or gas and include hydrocarbon fuels from petroleum products such as gasoline, diesel fuel and kerosine. Preferably, the fuel used in the subject invention is an alcohol, natural gas or propane. More specifically, the preferred alcohols are ethanol made from various grains and methanol traditionally manufactured from coal, natural gas or other feed stocks. Whichever fuel is used, it must be partially oxidized and reformed to provide a hydrogen-containing gas. By way of illustration, hydrogen may be produced from methanol by either partial oxidation or steam reforming, for which the overall reactions are:

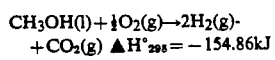

$CH_3OH(l) + \frac{1}{2}O_2(g) \rightarrow 2H_2(g) + CO_2(g) \quad \Delta H°_{298} = -154.86 kJ$

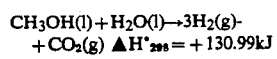

$CH_3OH(l) + H_2O(l) \rightarrow 3H_2(g) + CO_2(g) \quad \Delta H°_{298} = +130.99 kJ$ Thus, partial oxidation reforming is exothermic, while steam reforming is endothermic.

Variously supported oxides of copper and zinc have been used most often for the steam reforming of methanol, although additions of alumina, iron and chromium, and alkaline earth metals have also been employed successfully. A wide variety of catalysts are well known in the art which provide exothermic partial oxidation of fuels, such as alcohols, and some such combinations of oxidation catalysts are: $NiO-ZrO_2$, $NiO-Al_2O_3-CaO$ and $Cu-Pd-SiO_2$, and reforming catalysts, such as $CuO-ZnO-Al_2O_3$, $NiO-Al_2O_3-MgO$, and $Cu-SiO_2$, may also be used for the partial oxidation reforming of methanol.

Both in partial oxidation and in steam reforming the product gas contains residual carbon monoxide. For use in a phosphoric acid fuel cell (PAFC), the CO must be reduced to less than 1%; for use in a proton exchange membrane (PEM) fuel cell, the residual CO must be reduced to trace amounts. The concentration of residual CO in the product gas can be reduced by injection of $H_2O$ along with the $CH_3OH$ in partial oxidation, and the use of excess $H_2O$ in steam reforming. Even so, reducing the CO concentration to acceptable levels may require a follow-on processing step (shift conversion or methanation), selective oxidation, using appropriate catalysts, well known in the art.

In partial oxidation reforming, the product should nominally consist of 41% $H_2$, 21% $CO_2$, and 38% $N_2$, if all the CO is oxidized to $CO_2$. In practice, however, the addition of $H_2O$ is required to reduce CO to low levels. Using a 1:1 molar mixture of $CH_3OH$ and $H_2O$ and selective oxidation of the residual CO, the product gas mixture contains 48% $H_2$, 20% $CO_2$, 11% $H_2O$, and 21% $N_2$. In steam reforming with 50% excess $H_2O$ and after residual CO removal, the product gas composition is 63% $H_2$, 22% $CO_2$, 11% $H_2O$, and 4% $N_2$. The lower hydrogen concentration from the partial oxidation reformer compared to that from the steam reformer (48% vs. 63%) leads to a Nernst voltage decrease of about 6 mV.

Partial oxidation reforming of $CH_3OH$ produces excess thermal energy which can be used to vaporize the methanol and water and to heat the reformed product gas. The net energy effect is that, from the 726.5 kJ of the higher heating value (HHV) of one mole of the input $CH_3OH$, the partial oxidation reformer yields $H_2$ with a theoretical maximum electrochemically available energy of 474.4 kJ.

Steam reforming of $CH_3OH$ requires the input of external energy. If the vaporizing and reforming energy is obtained from the fuel cell stack waste heat and the combustion of the spent fuel leaving the stack, the net effect is to convert the 726.5 kJ of the HHV of an input mole of $CH_3OH$ to a theoretical maximum electrochemically available energy of 711.6 kJ as $H_2$. If the stack waste heat and spent gas combustion are not used to provide the vaporizing and reforming energy, then the maximum electrochemically available energy is 512.6 kJ, which is only slightly greater than that obtainable with partial oxidation reforming.

The dynamic response and start-up performance of the partial oxidation reformer can be much superior to that of the steam reformer. This is because the partial oxidation reformer uses direct heat transfer, due to the exothermic nature of the oxidation reaction, which provides very high heat fluxes, and therefore, the required heat transfer loads can increase or decrease rapidly. In contrast, a steam reformer must use indirect heat transfer, which limits heat fluxes. The high heat fluxes in direct heat transfer can make a partial oxidation reformer/fuel vaporizer start-up quickly; the lower heat fluxes in indirect heat transfer do not permit as rapid a start-up for a steam reformer/vaporizer, even if process gas recirculation is used to enhance the convective heat transfer.

The partial oxidation reformer is an intrinsically simple device due to little or no dependence on burners, baffles, heat transfer surfaces, and combustion manifolding and ducting. In comparison, a steam reformer is relatively complex; it contains one or more burners, extended heat transfer surfaces, combustion air and exhaust ductwork, and perhaps even a process gas recirculator. Because of the high heat fluxes available, the partial oxidation reformer can be more compact than a steam reformer of equal fuel processing capacity. Also, since the combustion products form part of the reformed gas itself, there is no separate reformer combustion exhaust stream from the partial oxidation reformer.

Figure 2:
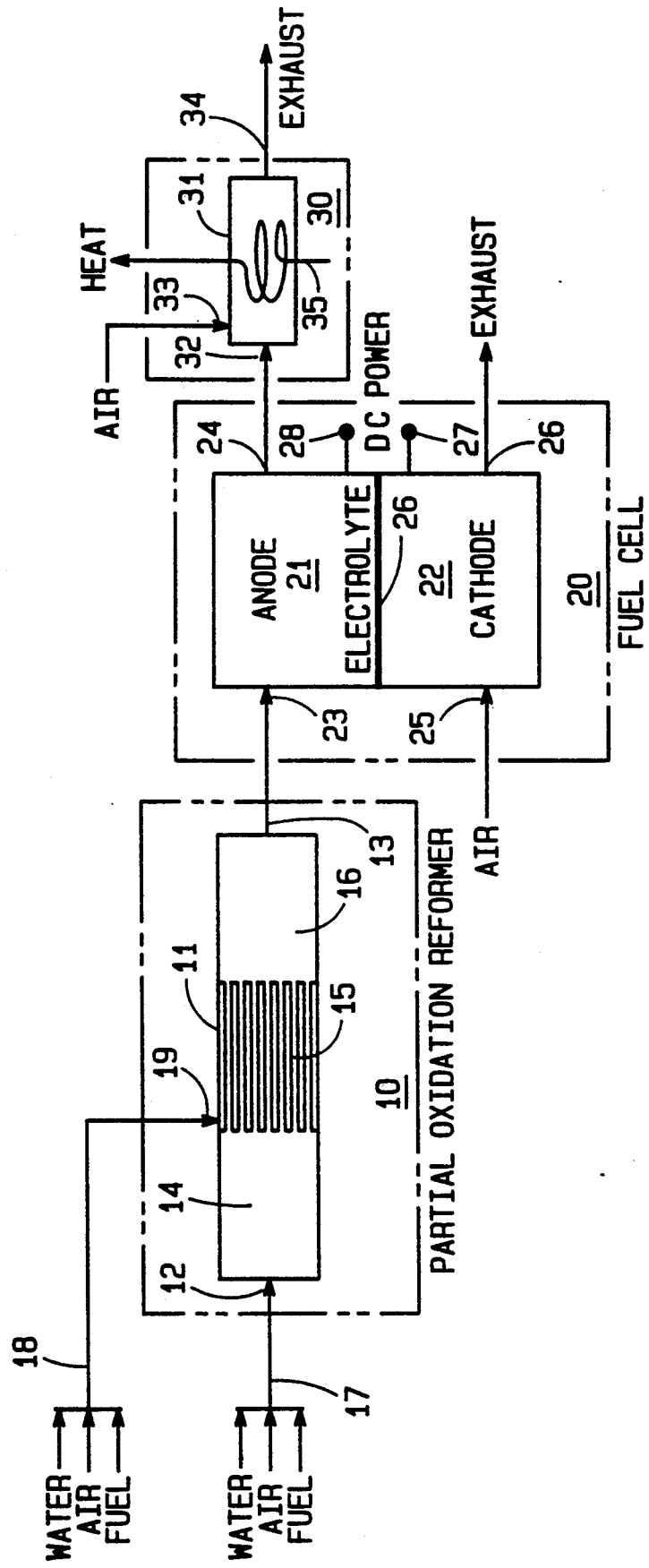
FIG. 2 is a schematic illustration of the combination of a partial oxidation reformer and fuel cell with an afterburner.

Referring now to FIG. 2 of the drawings, there is shown a combination of a partial oxidation reformer 10 with a fuel cell 20 and an afterburner 30. The partial oxidation reformer 10 is an elongated member having a outer shell 11 with an inlet 12 and outlet 13. The partial oxidation reformer 10 is formed into three zones; an oxidation zone 14, a reforming zone 15, a second oxidation zone 16. A water-air-fuel inlet mixture 17 is introduced through the first inlet 12 and a water-air-fuel 18, which may be the same as or different than the mixture 17, is introduced into the reforming zone 15 at inlet 19. The output from the partial oxidation reformer 10 is transmitted to the fuel cell 20 and more particularly to the anode or negative electrode 21 at an inlet 23, the fuel cell 20 having a positive electrode or cathode 22 separated from the negative electrode or anode 21 by an electrolyte 26. The cathode 22 has an inlet 25 through which air at approximately 100% in excess of the electrochemical requirement is introduced. In addition it has an exhaust outlet 26 through which the unused air vents. The fuel cell 20 may be of the phosphoric acid type or the proton exchange membrane type, both of which are disclosed in the Fuel Cell Handbook by Appleby and Foulkes, published by Van Nostrand, Reinhold 1989 edition, and more specifically, at the portion starting on page 182 and ending at 190. Specifically mentioned are the above disclosed phosphoric acid-type, and proton exchange membrane-type (also called the solid polymer electrolyte (SPE) type). The exact nature of the fuel cell is not a requisite for the invention so long as one of the types well known and useful in vehicle systems is provided. The output from the negative electrode, or anode 21, includes some hydrogen which has not been used and that is transmitted to the inlet 32 of the afterburner unit 30 into which is also introduced air through an inlet 33 and burned in the unit 31 to provide heat which is extracted by means of usual heat exchange mechanism 35 for heating or cooling the interior of the associated vehicle, the remainder being exhausted at outlet 34.

The catalysts useful in the zone 14 are the typical oxidation catalysts which are well known but represented by the nickel oxide-zirconium oxide catalyst, the nickel oxide-alumina-calcium oxide catalyst, and the copper-palladium-silica catalyst. The catalysts useful in the reforming zone 15 of the partial oxidation reformer 10 are also well known and are represented by the copper oxide-zinc oxide-alumina catalyst, nickel oxide-alumina-magnesium oxide catalyst, and the copper-silica catalyst previously disclosed. The oxidation catalyst useful in the zone 15 may be either an oxidation catalyst which is capable of converting the carbon monoxide to carbon dioxide or a methanation catalyst capable of converting the available carbon monoxide to methane, also well known in the art. As before stated, the fuel-air-water mixtures introduced at the inlet 12 may be different than the mixtures introduced at the inlet 19, specifically the mixtures introduced at inlet 19 may have greater amounts of water and less air in order to obtain a higher concentration of hydrogen gas in the output stream from the partial oxidation reformer 10. Typically, if the fuel consists mostly of methanol, the partial oxidation reformer 10 can be operated at a temperature of about 200° C. or less while if a fuel consisting principally of ethanol is used, the partial oxidation reformer 10 is operated at a temperature in the 400°–450° C. range, and if a fuel consisting principally of propane is used, the partial oxidation reformer is required to be operated at yet a higher temperature of about 600° C.

Additionally, the pressure range at which the partial oxidation reformer 10 is operated depends also upon the type of fuel cell 20 used in the combination or system. If a phosphoric acid fuel cell is used, then a reformer tends to operate at atmospheric pressure, while if a solid polymer electrolyte fuel cell is used, then the reformer will need to operate at about 2–5 atmospheres.

Figure 3:
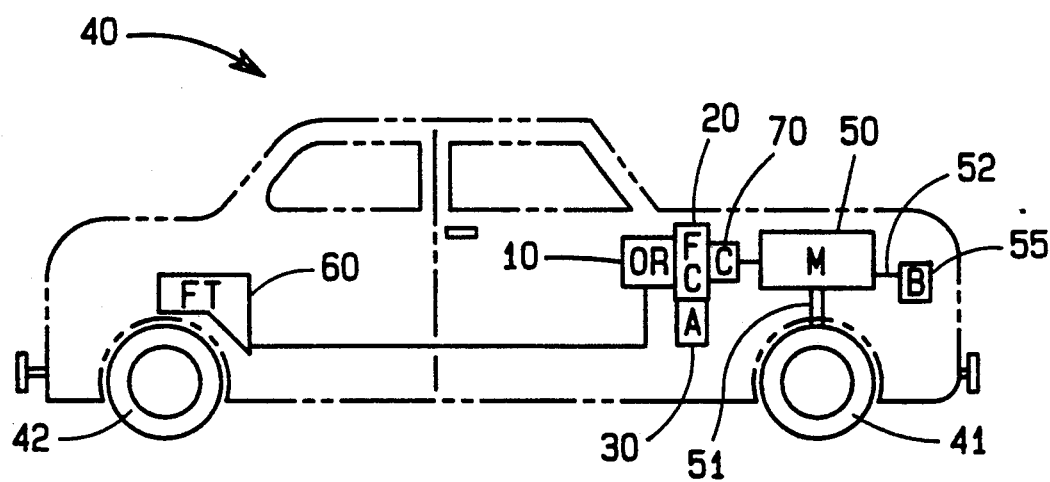
FIG. 3 is a schematic illustration of a vehicle incorporating the partial oxidation reformer and fuel cell combination illustrated in FIG. 2.

Referring now to FIG. 3 of the drawings, there is illustrated an automobile 40 representative of the type of vehicles in which the subject invention is useful. The vehicle 40 is provided with a pair of front wheels 41, a pair of rear wheels 42, and an electric motor 50 connected to one of the pairs 41, 42 as by a drive shaft 51 and is electrically connected by suitable means 52 to a battery 55. The battery 55 can be used to start the vehicle 40 in the same manner batteries function with internal combustion engines and to run accessories. A partial oxidation reformer 10 of the type previously described, is in liquid or gas communication with a fuel tank 60 and is connected to a fuel cell 20 of the type previously described. An afterburner 30 is connected to the off gases from the negative electrode or anode 21 of the fuel cell and is used to react the remaining hydrogen in the gas leaving the anode 21 to extract heat therefrom for either heating or cooling the passenger compartment of the automobile 40, as required. A motor controller 70 is interposed between the fuel cell 20 and the electric motor 50 and coordinates the dc power output from the fuel cell 20 and the variable speed requirements for the motor 50. Such motor controllers are well known in the art.

Although, as illustrated in FIG. 3, there is a single feed from the fuel tank 60 to the partial oxidation reformer 10, it is contemplated that multiple feeds be provided as previously discussed with respect to the partial oxidation reformer 10. Moreover, it is contemplated that the partial oxidation reformer 10 will be a multiple zone reformer as previously illustrated, with the final zone thereof containing either an oxidation catalyst for converting carbon monoxide to carbon dioxide or containing a methanation catalyst for converting carbon monoxide to methane.

The main object of this invention is obtained by the combination of the partial oxidation reformer 10 and the fuel cell 20 which provides rapid response to variable acceleration demands by the motor 50 due to the exothermic reaction, thereby obviating the need for thermal energy input to the partial oxidation reformer 10 during periods of acceleration or increased power demand.

Other objects of this invention have been attained by the novel partial oxidation reformer 10 disclosed having multiple inputs of fuel-air-water mixtures, alone or in combination with a fuel cell suitable for a vehicle and in combination with the necessary components for a vehicle.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A propulsion system for a vehicle comprising a fuel cell having a positive electrode and a negative electrode separated by an electrolyte, means for delivering a source of oxygen to the positive electrode of said fuel cell, means for partially oxidizing and reforming hydrogen-containing fuel with water and air in an overall exothermic reaction to provide sufficient energy from the exothermic partial reaction to initiate and sustain the endothermic reformation reaction to produce a hydrogen-containing gas without an external thermal energy input, and means for delivering the hydrogen-containing gas to said negative electrode of said fuel cell, whereby delivery of said hydrogen-containing gas to said negative electrode and oxygen to said positive electrode of said fuel cell produces dc power for operating an electric motor in a vehicle.

2. The propulsion system of claim 1, wherein said fuel cell is a proton exchange membrane fuel cell or a phosphoric acid fuel cell.

3. The propulsion system of claim 1, wherein said means for partially oxidizing and reforming the fuel includes successive oxidation and reforming catalysts.

4. The propulsion system of claim 3, wherein the oxidation catalyst is one or more of $NiO$-$ZrO_2$, $NiO$-$Al_2O_3$-$CaO$ and $Cu$-$Pd$-$SiO_2$.

5. The propulsion system of claim 3, wherein the reforming catalyst is one or more of $CuO$-$ZnO$-$Al_2O_3$, $NiO$-$Al_2O_3$-$MgO$ and $Cu$-$SiO_2$.

6. The propulsion system of claim 1, wherein the fuel is a gas or liquid hydrocarbon, alcohol, or alcohols, natural gas, or propane.

7. The propulsion system of claim 6, wherein the fuel is an alcohol or mixtures thereof, natural gas or propane.

8. The propulsion system of claim 7 wherein the fuel is methanol, ethanol or mixtures thereof, or natural gas.

9. The propulsion system of claim 1, and further comprising an afterburner unit for oxidizing any unreacted hydrogen leaving said negative electrode of said fuel cell.

10. The propulsion system of claim 3, and further including means for introducing a mixture of water and air and fuel to an oxidation catalyst and means for introducing a mixture of water and air and fuel to a reforming catalyst.

11. The propulsion system of claim 10, wherein the mixture introduced to the oxidation catalyst is different than the mixture introduced to the reforming catalyst.

12. A vehicle having pairs of front and rear wheels and a fuel tank, an electrically driven motor having an output shaft operatively connected to at least one of said pair of wheels, a fuel cell operatively connected to said motor and having a positive electrode and a negative electrode separated by an electrolyte for producing dc power to operate said electrically driven motor, a partial oxidation reformer operatively connected to said fuel tank and to said fuel cell and having means for receiving hydrogen-containing fuel from said fuel tank and water and air and for partially oxidizing and reforming the fuel with water and air in the presence of an oxidizing catalyst and a reforming catalyst in an overall exothermic reaction to provide sufficient energy from the exothermic partial oxidation reaction to initiate and sustain the endothermic reformation reaction to produce a hydrogen-containing gas without an external thermal energy input, means for transporting the hydrogen-containing gas from said partial oxidation reformer to said fuel cell negative electrode while air is transported to said fuel cell positive electrode to produce dc power for operating said electric motor and the pair of wheels operatively connected thereto.

13. The vehicle of claim 12, wherein said partial oxidation reformer has a longitudinal flow path and a mixture of water and air and fuel is introduced into said partial oxidation reformer at longitudinally spaced apart points of the flow path.

14. The vehicle of claim 13, wherein the oxidizing catalyst is one or more of $NiO-ZrO_2$ or $NiO-Al_2O_3CaO$ or $Cu-Pd-SiO_2$.

15. The vehicle of claim 14, wherein the reforming catalyst is one or more of $CuO-ZnO-Al_2O_3$, $NiO-Al_2O_3-MgO$ and $Cu-SiO_2$.

16. The vehicle of claim 13, wherein the fuel cell is a proton exchange membrane cell or a phosphoric acid cell.

17. The vehicle of 13, wherein gas containing some hydrogen exits from said fuel cell negative electrode during production of dc power and further including a unit for oxidizing the hydrogen in the exit gas from said negative electrode to produce heat which may be used to heat or cool the vehicle.

18. A partial oxidation reformer comprising a longitudinally extending container having an inlet at one end thereof and an outlet at the other end thereof, a first zone holding an oxidation catalyst and a second zone longitudinally spaced from said first zone holding a reforming catalyst, a second inlet near said second zone, means for introducing a first mixture of water and air and fuel into said first zone, means for introducing a second mixture of water and air and fuel into said second zone, said first zone oxidation catalyst in contact with said first zone oxidation catalyst in contact with said first mixture producing a first product gas with some hydrogen and sufficient heat to initiate and maintain an endothermic reaction in said second zone to produce a product gas richer in hydrogen than said product from said first zone, whereby to provide oxidation and steam reforming reactions capable of being sustained without outside thermal energy.

19. The partial oxidation reformer of claim 18, wherein said first zone contains one or more of $NiO-ZrO_2$, $NiO-Al_2O_3-CaO$ and $Cu-Pd-SiO_2$.

20. The partial oxidation reformer of claim 18, wherein said second zone contains one or more of $CuO-ZnO-Al_2O_3$, $NiO-Al_2O_3-MgO$ and $Cu-SiO_2$.

21. The partial oxidation reformer of claim 18 and further comprising a third zone holding an oxidation catalyst or a methanation catalyst.

22. The partial oxidation reformer of claim 21, wherein said oxidation catalyst in said third zone converts carbon monoxide present to carbon dioxide.

23. The partial oxidation reformer of claim 21, wherein said methanation catalyst in said third zone converts carbon monoxide present to methane.

* * * * *